United States Patent
Irisawa

(10) Patent No.: US 7,198,030 B2
(45) Date of Patent: Apr. 3, 2007

(54) INTERNAL COMBUSTION ENGINE

(75) Inventor: Yasuyuki Irisawa, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/563,152

(22) PCT Filed: Jun. 22, 2004

(86) PCT No.: PCT/JP2004/009087

§ 371 (c)(1),
(2), (4) Date: Jan. 4, 2006

(87) PCT Pub. No.: WO2005/005811

PCT Pub. Date: Jan. 20, 2005

(65) Prior Publication Data

US 2006/0162692 A1   Jul. 27, 2006

(30) Foreign Application Priority Data

Jul. 9, 2003   (JP) .............................. 2003-194353

(51) Int. Cl.
- F02D 41/18 (2006.01)
- F02D 41/04 (2006.01)
- F02D 23/02 (2006.01)

(52) U.S. Cl. ................... 123/399; 60/599; 123/344; 123/478

(58) Field of Classification Search ............... 123/352, 123/357, 399, 478, 480, 344; 701/103, 104; 60/599

See application file for complete search history.

(56) References Cited

U.S. PATENT DOCUMENTS

| 5,450,836 A | * | 9/1995 | Kashiwabara .............. 123/683 |
| 5,875,761 A | * | 3/1999 | Fujieda et al. .............. 123/399 |
| 7,043,900 B2 | * | 5/2006 | Shirakawa et al. ........... 60/280 |
| 2003/0040232 A1 | * | 2/2003 | Saito .......................... 440/87 |

FOREIGN PATENT DOCUMENTS

| EP | 0 892 165 A2 | 1/1999 |
| JP | A-03-023327 | 1/1991 |
| JP | A-07-158462 | 6/1995 |
| JP | A-10-176522 | 6/1998 |
| JP | A-11-036994 | 2/1999 |
| JP | A-2001-182563 | 7/2001 |
| JP | A-2002-332887 | 11/2002 |

* cited by examiner

Primary Examiner—T. M. Argenbright
(74) Attorney, Agent, or Firm—Oliff & Berridge PLC

(57) ABSTRACT

An internal combustion engine is operated with a predetermined fixed A/F ratio in an operating range where the amount of intake air is not larger than a predetermined value but, in an operating range where the amount of intake air is larger than the predetermined value, the internal engine is operated with a variable lean A/F ratio which increases from the fixed A/F ratio as the amount of intake air increases. To achieve this, in a throttle valve (7a) whose opening is controlled based on a signal from an accelerator pedal position sensor (17), control is performed so that the correspondence ratio between the accelerator pedal position and the throttle valve opening increases as the A/F ratio increases. In the operating range where the engine is operated with a variable lean A/F ratio, the amount of intake air is increased by using a turbocharger (2). Then, fuel atomization is promoted by controlling the intake air cooling effect of an intercooler (6) so that the temperature of the intake air rises as the A/F ratio increases.

9 Claims, 13 Drawing Sheets

INTERNAL COMBUSTION ENGINE

TECHNICAL FIELD

The present invention relates to an internal combustion engine and, more particularly, to an internal combustion engine that is operated with a lean A/F ratio where the ratio of air to fuel is higher than the stoichiometric ratio.

BACKGROUND ART

Internal combustion engines that run with an A/F ratio significantly leaner than stoichiometric ratio are being developed, and some have already been commercially implemented.

For example, there is an apparatus disclosed in Japanese Unexamined Patent Publication No. H07-158462. In the apparatus disclosed therein, when an accelerating condition is detected by an acceleration detecting means, engine boost pressure is increased while maintaining a lean A/F ratio. However, in the apparatus disclosed in the cited patent document, the engine is operated with a lean A/F ratio only within the range indicated as a region 2 in FIG. 6 in the cited patent document, and is not operated with a lean A/F ratio in the high-speed, high-load range.

Further, Japanese Unexamined Patent Publication No. H03-23327 discloses an internal combustion engine that runs with a lean A/F ratio in the high-speed, high-load range, but the engine is designed to operate at stoichiometry in the low-to-mid speed, low-to-mid load range.

On the other hand, from the standpoint of saving energy, there is a need for engines that consume less fuel. However, with the internal combustion engine disclosed in the above patent document 1, as the engine is not operated with a lean A/F ratio in the high-speed, high-load operating range, fuel consumption is high in the high-speed, high-load driving range. Conversely, with the internal combustion engine disclosed in the above patent document 2, as the engine is designed to operate at stoichiometry in the low-to-mid speed, low-to-mid load range, fuel consumption is high in the low-to-mid speed, low-to-mid load operating range.

DISCLOSURE OF THE INVENTION

In view of the above problems, it is an object of the present invention to provide an internal combustion engine that can operate with a lean A/F ratio over a wide operating range and can thus reduce fuel consumption.

According to the present invention, there is provided an internal combustion engine wherein the engine is operated with a predetermined fixed A/F ratio in an operating range where the amount of intake air is not larger than a predetermined value but, in an operating range where the amount of intake air is larger than the predetermined value, the engine is operated with a variable lean A/F ratio which increases from the fixed A/F ratio as the amount of intake air increases.

With the thus configured internal combustion engine, fuel consumption can be reduced because, in the operating range where the amount of intake air is not larger than the predetermined amount of air, the engine is operated with a predetermined fixed A/F ratio but, in the operating range where the amount of intake air is larger than the predetermined amount of air, the engine is operated with a variable lean A/F ratio which increases from the fixed A/F ratio as the amount of intake air increases. Furthermore, the increase in NOx is suppressed by increasing the A/F ratio as the amount of intake air increases.

In one preferred mode of the invention, the amount of intake air is controlled by an intake air flow control means, the intake air flow control means being configured to adjust the amount of intake air in accordance with accelerator pedal position, and an accelerator correspondence ratio, which represents the correspondence ratio between the accelerator pedal position and throttle valve opening, is increased as the A/F ratio increases.

Thus, in the operating range with the variable lean A/F ratio, the engine is operated with a larger amount of intake air than in the operating range with the fixed A/F ratio; this serves to reduce the pumping loss and improve the fuel economy.

In one preferred mode of the invention, the intake air flow control means is an electronic throttle valve that controls throttle valve opening by an electrical signal, and an accelerator pedal position detecting means for detecting the accelerator pedal position is attached to an accelerator pedal, wherein the electronic throttle valve controls the throttle valve opening based on an electrical signal supplied from the accelerator pedal position detecting means.

In one preferred mode of the invention, the internal combustion engine further comprises a supercharger for pressurizing intake air, and the amount of intake air is increased by using the supercharger, at least in the operating range where the engine is operated with the variable lean A/F ratio.

In the thus configured internal combustion engine, the amount of intake air is increased by using the supercharger, in the operating range where the engine is operated with the variable A/F ratio.

In one preferred mode of the invention, the internal combustion engine further comprises a pressurized air cooling means for cooling the intake air pressurized by the supercharger, and a pressurized air cooling control means for controlling the degree of cooling of the pressurized intake air passing through the pressurized air cooling means, wherein in the operating range where the engine is operated with the variable lean A/F ratio, intake air temperature is controlled so that the temperature of the intake air increases as the A/F ratio increases.

In the thus configured internal combustion engine, when the engine is operated with the variable A/F ratio, control is performed so as to increase the temperature of the intake air as the A/F ratio increases and thereby to promote fuel atomization.

In one preferred mode of the invention, the internal combustion engine further comprises a bypass air passage for allowing the pressurized intake air to flow by bypassing the pressurized air cooling means, and the pressurized air cooling control means controls the temperature of the pressurized intake air by controlling the amount of intake air passing through the bypass air passage.

In one preferred mode of the invention, the pressurized air cooling means has a coolant passage through which a coolant flows, and the pressurized air cooling control means controls the temperature of the pressurized intake air by controlling the flow rate of the coolant.

BEST MODE FOR CARRYING OUT THE INVENTION

Figure 1:
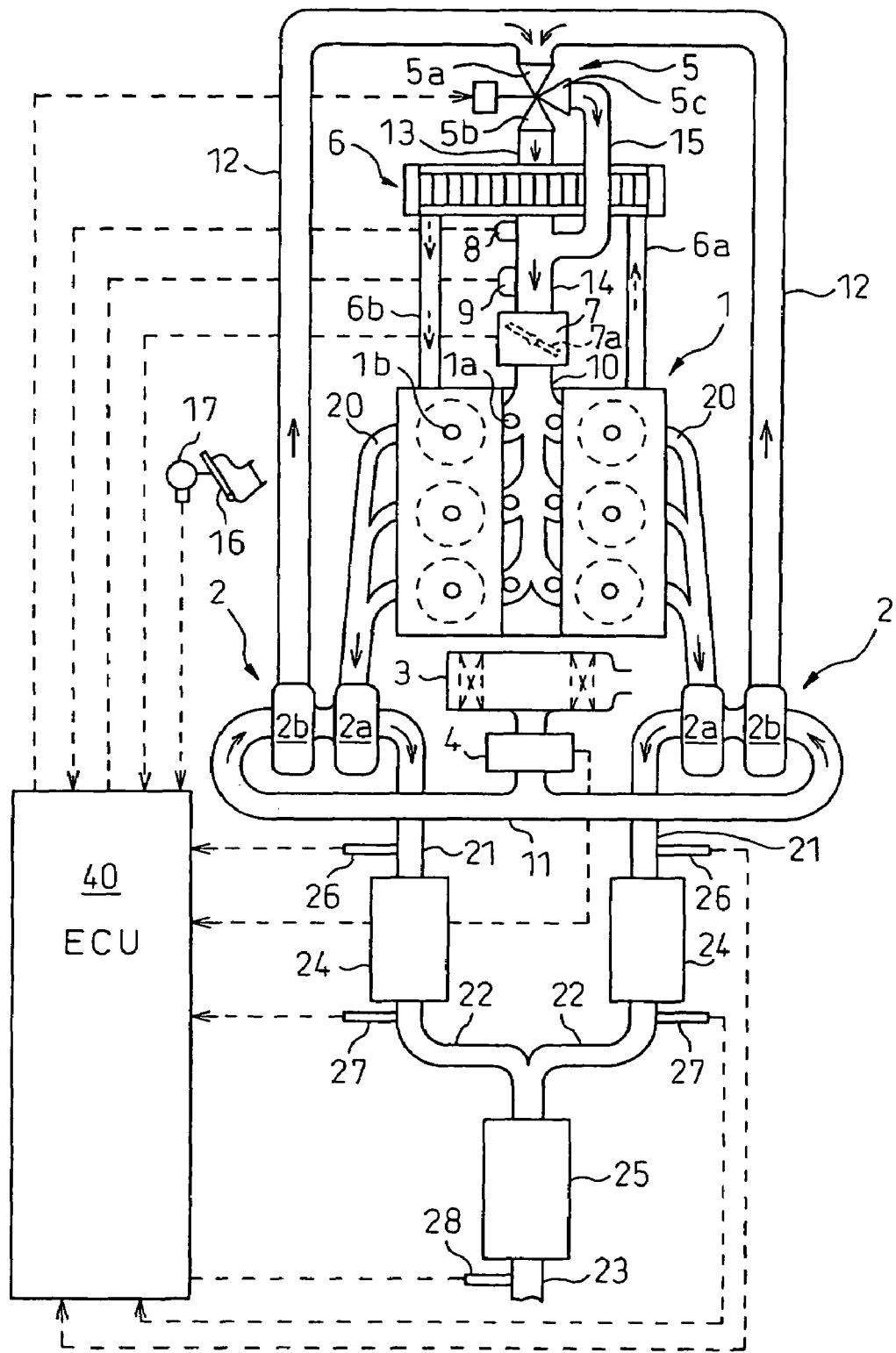
FIG. 1 is a diagram showing the configuration of a first embodiment.

Embodiments of the present invention will be described below with reference to the accompanying drawings. FIG. 1 is a diagram showing the general configuration of a control apparatus according to the present invention. The internal combustion engine 1 shown here is a V-configured six-cylinder gasoline engine with a fuel injection valve 1a and a spark plug 1b provided for each cylinder. The internal combustion engine 1 is also provided with an intake manifold 10 and an exhaust manifold 20.

The outlet of an air cleaner 3 is connected to the inlet of a compressor chamber 2b of a turbocharger 2 via a first intake pipe 11 in which is mounted an air flow meter 4 for metering the amount of intake air. The outlet of the compressor chamber 2b of the turbocharger 2 is connected to a first port 5a of an intercooler air flow control valve 5 via a second intake pipe 12.

A second port 5b of the intercooler air flow control valve 5 is connected to the inlet of an intercooler 6 via a third intake pipe 13. The outlet of the intercooler 6 is connected to a throttle body 7 via a fourth intake pipe 14 in which are mounted an intake pipe pressure sensor 8 and an intake air temperature sensor 9. A third port 5c of the intercooler air flow control valve 5 is connected to the fourth intake pipe 14 via a fifth intake pipe 15 bypassing the intercooler 6.

The intercooler 6 is a water cooled type and contains a coolant circuit not shown; in operation, a coolant is fed from the internal combustion engine 1 through a first coolant pipe 6a and returned to the internal combustion engine 1 through a second coolant pipe 6b. In the present embodiment, the intercooler 6 is a water cooled type, as just described, but an air cooled type may be used.

The exhaust manifold 20 is connected to the inlet of a turbine chamber 2a of the turbocharger 2. The outlet of the turbine chamber 2a of the turbocharger 2 is connected to the inlet of a first catalyst 24 via a first exhaust pipe 21 in which is mounted an A/F sensor 26. The outlet of the first catalyst 24 is connected to a second catalyst 25 via a second exhaust pipe 22 in which is mounted a first $O_2$ sensor 27. The outlet of the second catalyst 25 is connected to a muffler not shown, via a third exhaust pipe 23 in which is mounted a second $O_2$ sensor 28.

The exhaust gas purifying method is a known method already used in practical applications, and therefore will not be described in detail here, but briefly, the first catalyst 24 is constructed from a three-way catalyst and the second catalyst 25 from an NOx storage-reduction three-way catalyst, and feedback control is performed based on signals from the A/F sensor 26, the first $O_2$ sensor 27, and the second $O_2$ sensor 28 so that the A/F ratio is controlled to a target value as will be described later.

An accelerator pedal 16 is fitted with an accelerator pedal position sensor 17 which detects accelerator pedal position. The accelerator pedal position detected by the accelerator pedal position sensor 17 is sent to an ECU (Electronic Control Unit) 40. The ECU 40 generates a signal proportional to the accelerator pedal position, and sends it to the throttle body 7 where a throttle valve 7a is driven by this signal.

According to the present invention, signals from the air flow meter 4, the intake air sensor 8, the A/F sensor 26, the first $O_2$ sensor 27, and the second $O_2$ sensor 28, as well as the signal from the accelerator pedal position sensor 17, are input to the ECU 40, and a signal for controlling the flow rate of the air passing through the intercooler is sent to the intercooler air flow control valve 5.

Many other sensors and actuators are connected to the ECU 40, but those that are not relevant to the present invention are not shown.

Based on the above configuration, the ECU 40 performs lean burn operation while suppressing the generation of NOx; first, a description will be given of how the A/F ratio is set.

Figure 3:
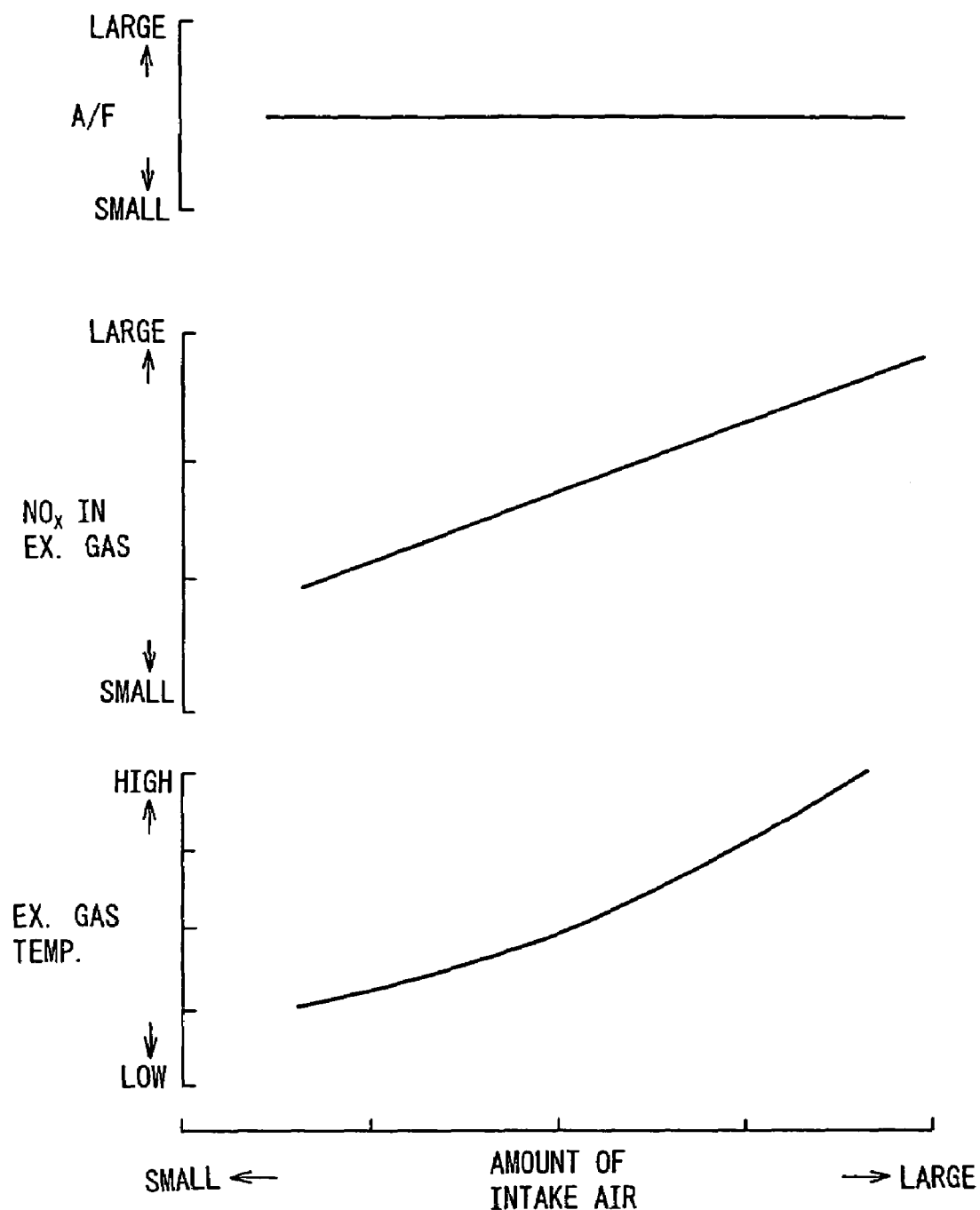
FIG. 3 is a diagram showing the exhaust gas temperature and the amount of NOx emission in the exhaust gas when the amount of intake air is increased while maintaining the A/F ratio at a constant level.

FIG. 3 is a diagram showing how the exhaust gas temperature and the amount of NOx emission in the exhaust gas change when the amount of intake air is increased while maintaining the A/F mixture at a constant lean A/F ratio; as can be seen, as the amount of intake air increases, the exhaust gas temperature rises, and the amount of NOx emission in the exhaust gas also increases.

Figure 4:
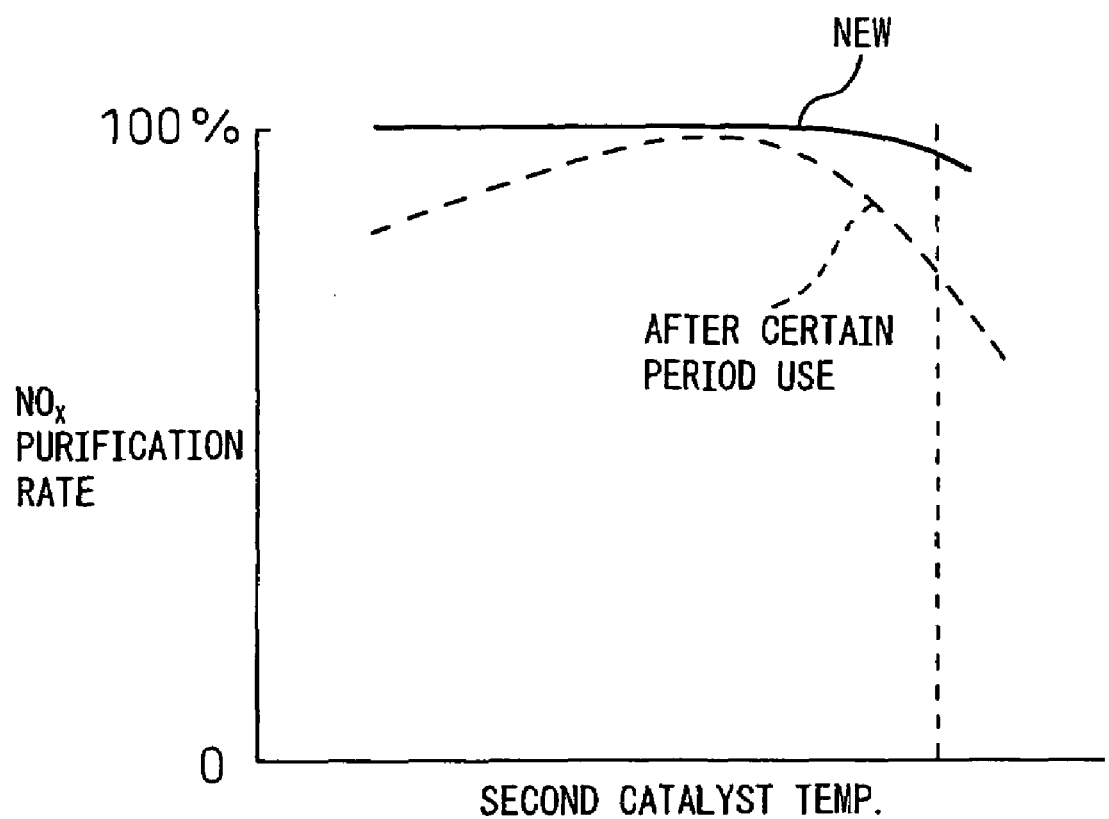
FIG. 4 is a diagram showing the relationship between exhaust gas temperature and NOx purification rate.

As shown in FIG. 4, the purification performance of the second catalyst drops when its temperature rises above a certain point.

Figure 5:
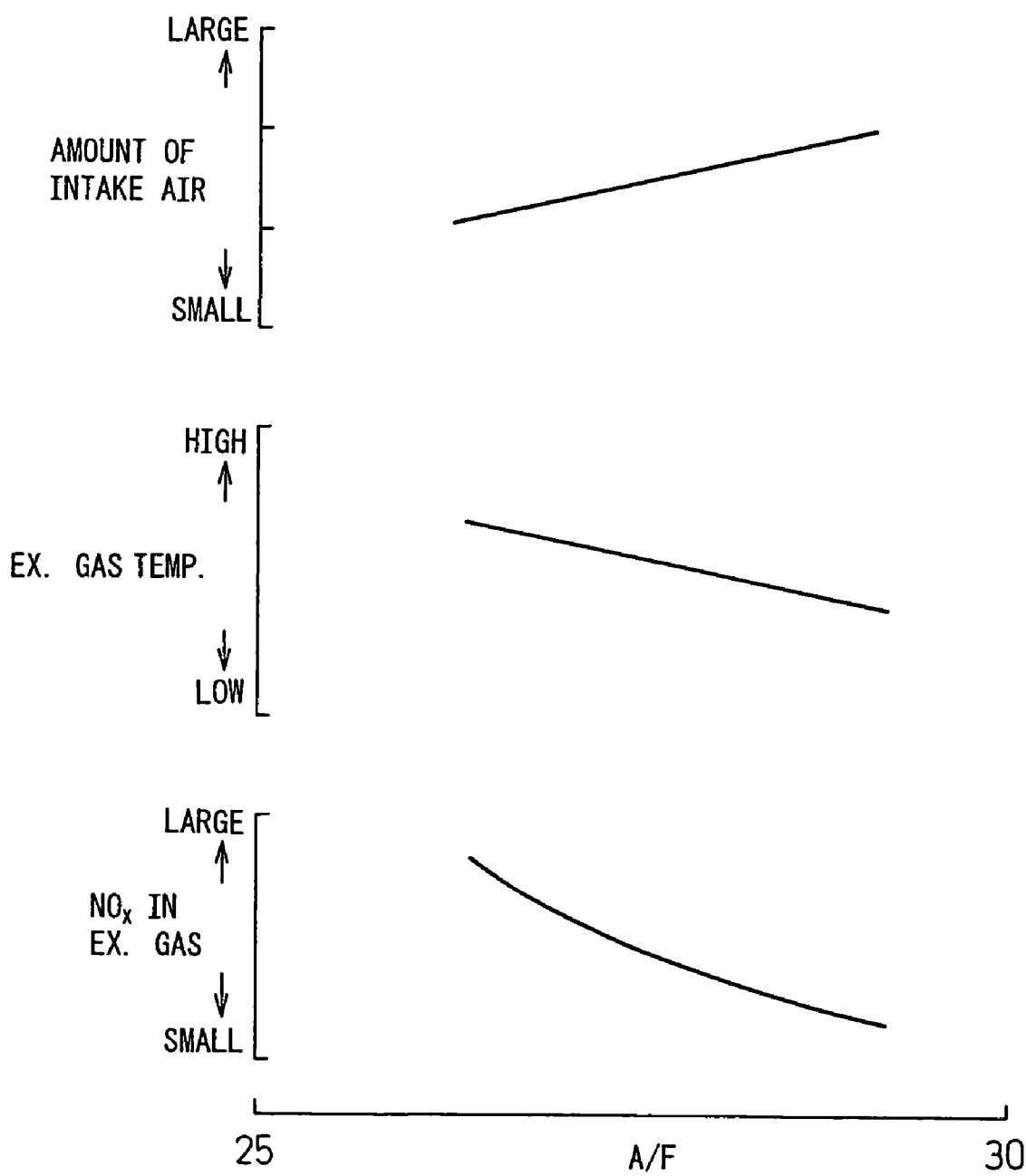
FIG. 5 is a diagram showing the amount of intake air, the exhaust gas temperature, and the amount of NOx emission as a function of the A/F ratio in a lean range under equal torque conditions.

On the other hand, FIG. 5 is a diagram showing the amount of intake air, the exhaust gas temperature, and the amount of NOx emission in the exhaust gas as a function of the A/F ratio in a lean burn range under equal torque conditions; as can be seen, as the A/F ratio increases, the exhaust gas temperature and the amount of NOx emission both decrease.

Figure 6:
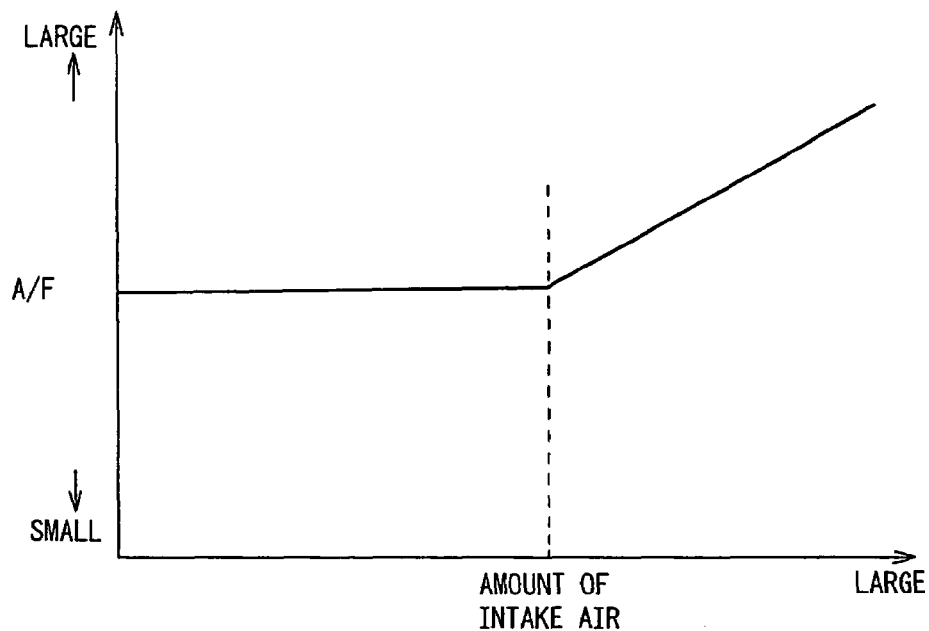
FIG. 6 is a diagram showing the setting of the A/F ratio as a function of the amount of intake air in accordance with the present invention.

In view of the above, in the present embodiment, the A/F ratio is fixed to a constant A/F ratio (lean A/F ratio) as long as the amount of intake air remains within a certain limit but, when the amount of intake air increases beyond that limit, the A/F ratio is varied as shown in FIG. 6, that is, the A/F ratio is increased as the amount of intake air increases. In the present embodiment, the fixed A/F ratio is chosen, for example, at or near 25.

Figure 7:
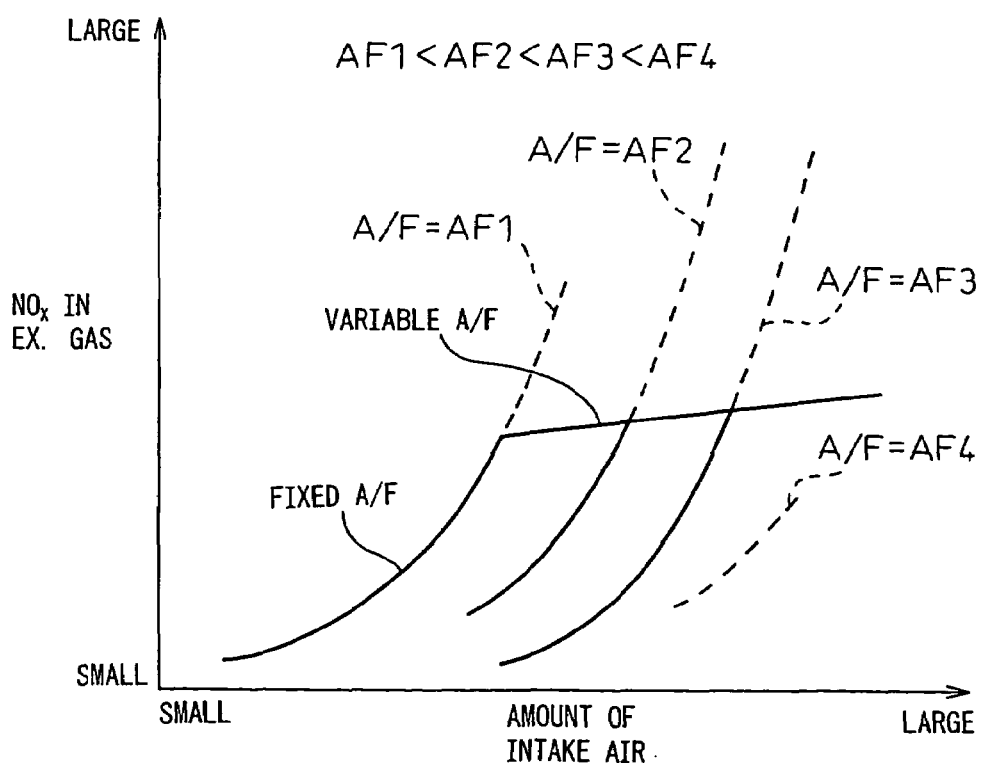
FIG. 7 is a diagram showing how the amount of NOx emission varies with the amount of intake air when the A/F ratio is set as shown in FIG. 6.

FIG. 7 is a diagram showing the effect of the above setting; that is, with the fixed A/F ratio, the amount of NOx emission increases rapidly as the amount of intake air increases but, as shown in FIG. 7, the increase in NOx is held to a minimum despite the increase in the amount of intake air. As a result, there is no need to increase the capacity of the second catalyst 25.

Figure 8:
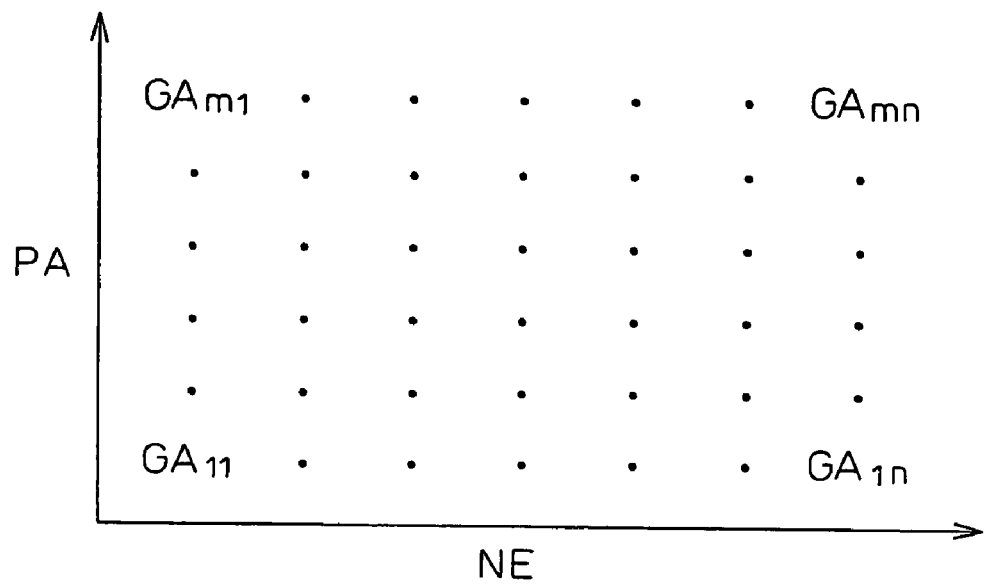
FIG. 8 is a map plotting the amount of intake air against the number of engine revolutions and accelerator pedal position.
Figure 9:
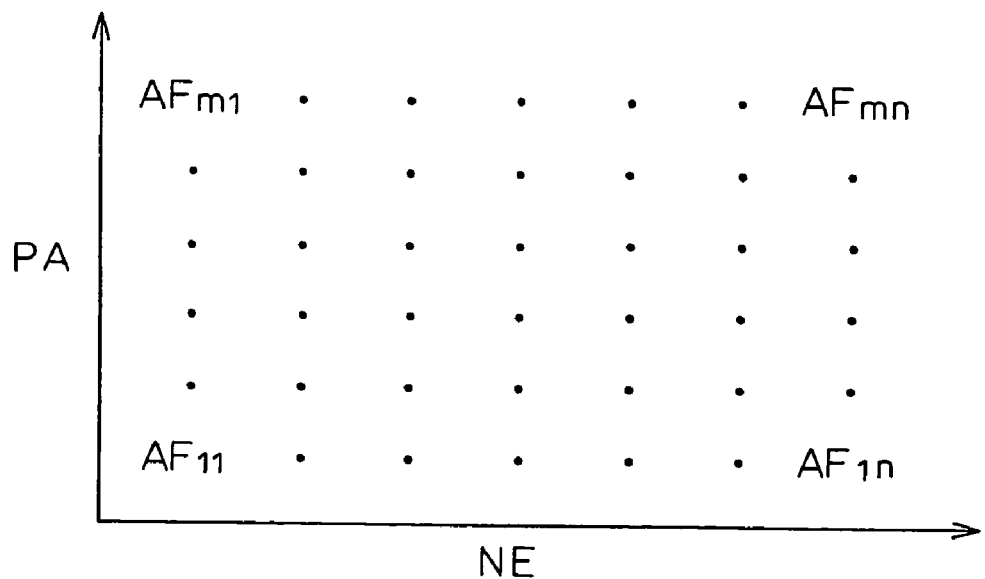
FIG. 9 is a map corresponding to FIG. 8 but plotting the A/F ratio against the number of engine revolutions and accelerator pedal position.

The amount of intake air is determined by the number of engine revolutions and the accelerator pedal position; therefore, the amount of intake air is actually determined as shown in a map given in FIG. 8. Accordingly, the A/F ratio is set in accordance with the number of engine revolutions and the accelerator pedal position, as shown in FIG. 9, in corresponding relationship to the map of FIG. 8; that is, the A/F ratio shown in FIG. 9 and the amount of intake air shown in FIG. 8 are set so as have a relationship such as shown in FIG. 6.

Figure 10:
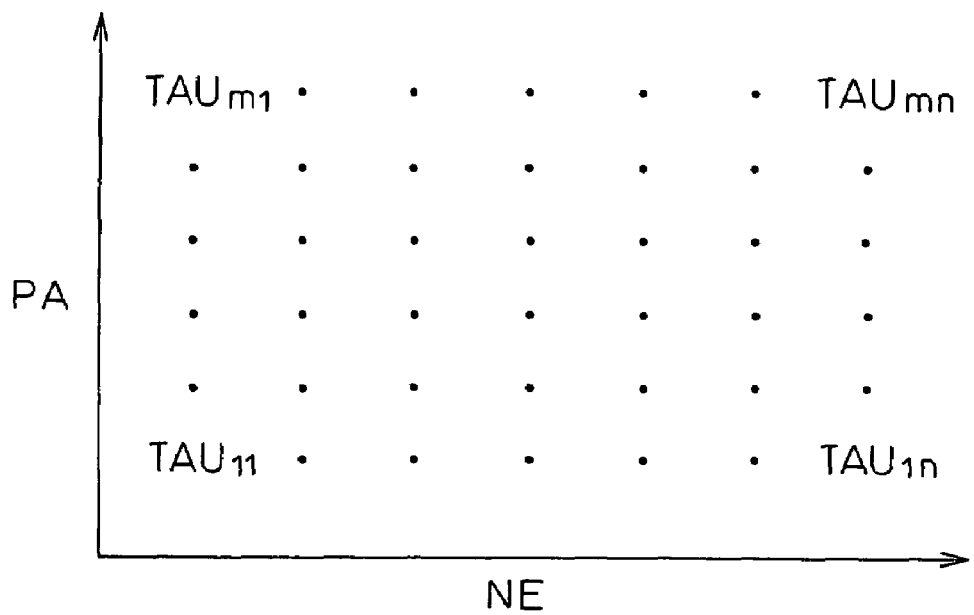
FIG. 10 is a map corresponding to FIG. 8 but plotting the amount of fuel injection against the number of engine revolutions and accelerator pedal position.
Figure 11:
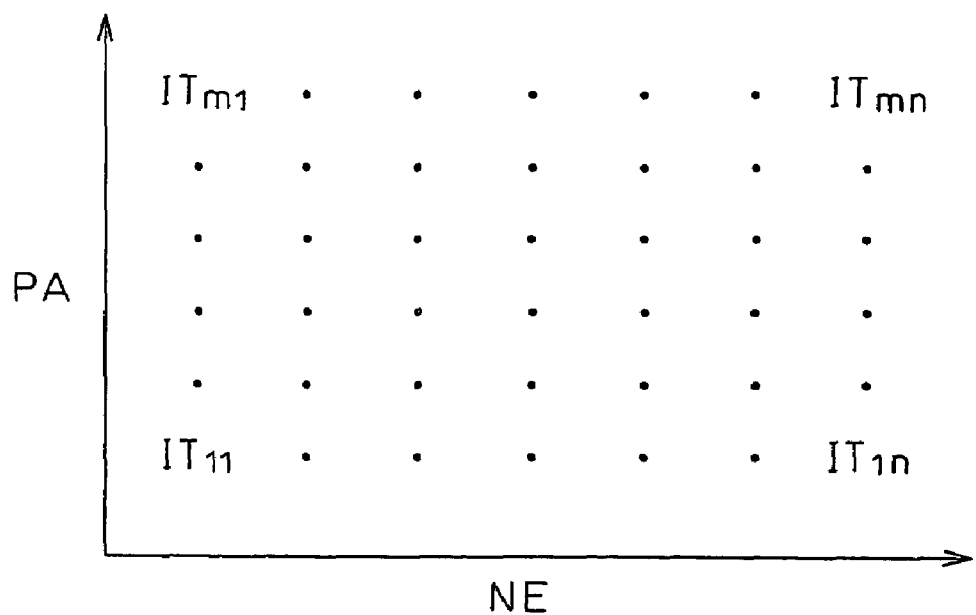
FIG. 11 is a map corresponding to FIG. 8 but plotting fuel injection timing against the number of engine revolutions and accelerator pedal position.
Figure 12:
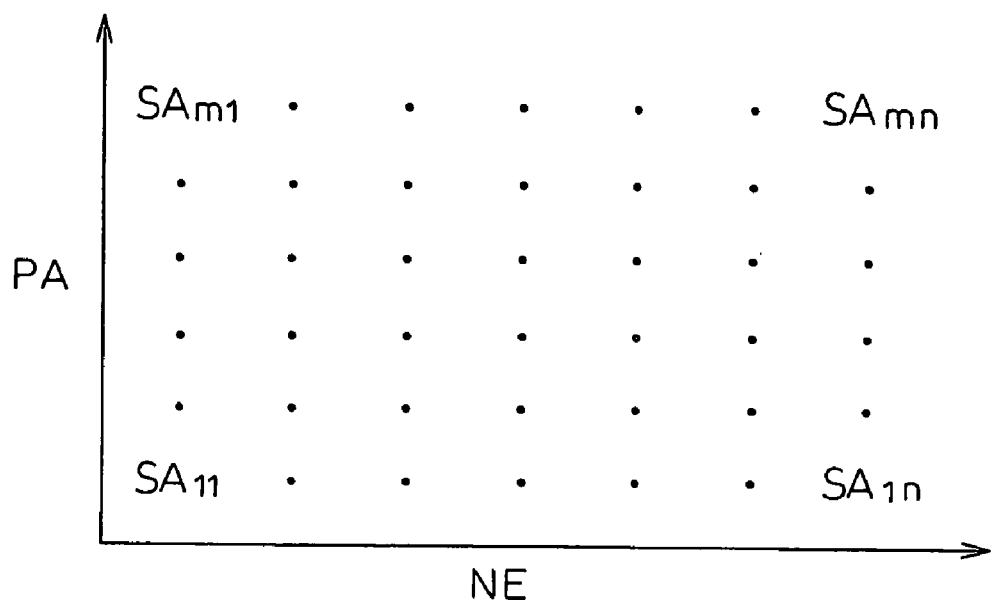
FIG. 12 is a map corresponding to FIG. 8 but plotting ignition timing against the number of engine revolutions and accelerator pedal position.

Further, in corresponding relationship to the amount of intake air in FIG. 8, the amount of fuel injection, TAU, is set in accordance with a map such as shown in FIG. 10, and fuel injection timing IT is set in accordance with a map such as shown in FIG. 11. The fuel is injected through the fuel injection valve 1a in accordance with these maps. On the other hand, ignition timing SA is set in accordance with a map such as shown in FIG. 12, and the spark plug 1b is fired in accordance with this map.

Figure 13:
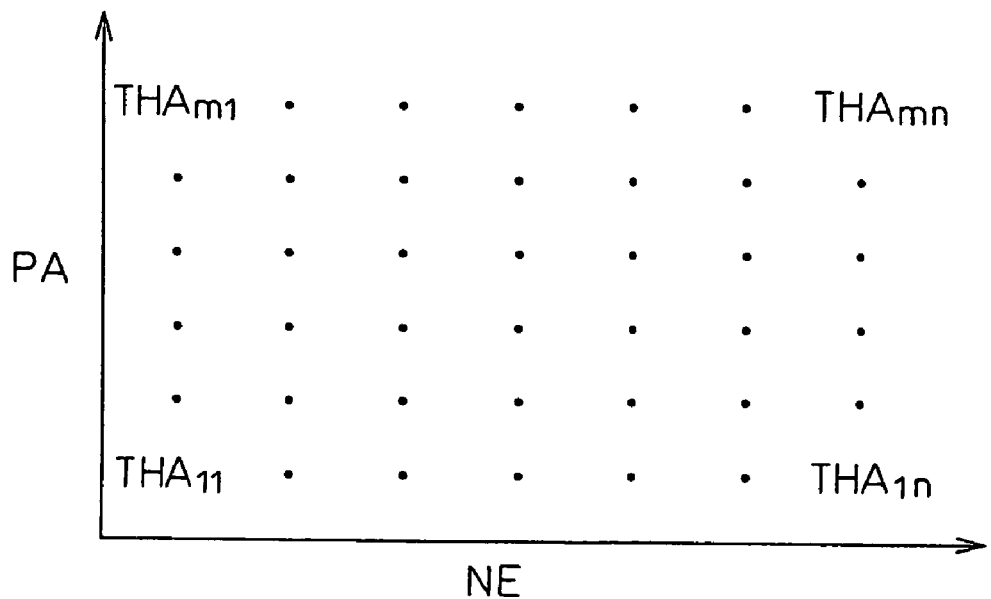
FIG. 13 is a map corresponding to FIG. 8 but plotting throttle valve opening against the number of engine revolutions and accelerator pedal position.

Further, throttle valve opening, THA, is set in accordance with a map such as shown in FIG. 13.

Figure 14:
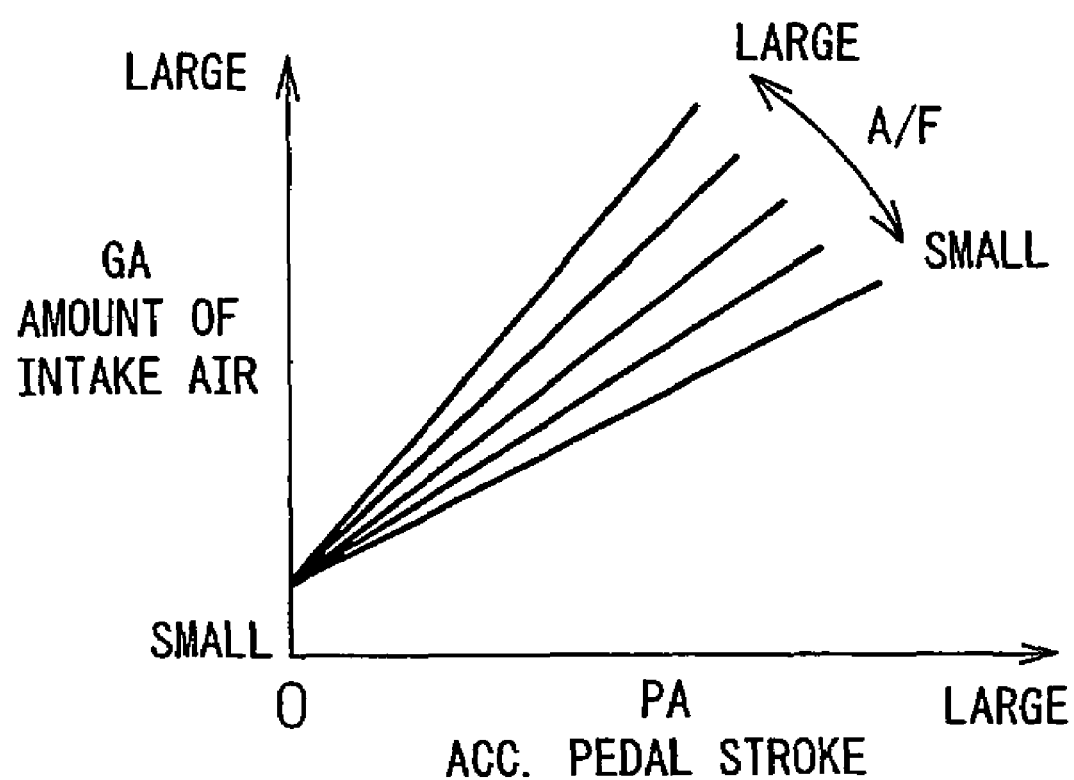
FIG. 14 is a diagram showing throttle valve ratios, i.e., the relationship between the accelerator pedal position and the throttle valve opening.

FIG. 14 is a diagram for explaining the accelerator correspondence ratio, i.e., the adjustment ratio between the accelerator pedal position, PA, and the amount of intake air, GA. The accelerator pedal position, PA, is plotted along the abscissa and the amount of intake air, GA, along the ordinate, and the slope of each line shown in the figure represents the accelerator correspondence ratio. As can be seen from the plurality of lines shown, the accelerator correspondence ratio increases as the A/F ratio increases.

In this way, as the A/F ratio increases, a larger amount of intake air is fed into each cylinder of the engine 1, reducing the pumping loss and, as a result, increasing the combustion efficiency and thus improving the fuel economy.

Here, the adjustment of the amount of intake air is not limited to being accomplished by the adjustment of the throttle valve opening, but any other suitable means can be used as long as it can adjust the amount of intake air; for example, use can be made of an ISC (Idle Speed Control) device that adjusts the amount of bypass air or a variable valve mechanism that adjusts valve opening.

The A/F ratio and various other operating parameters are set as described above. Then, under the above settings, the following control is performed in accordance with the flowchart of FIG. 15.

First, in step 1, the amount of intake air, GA, is obtained. This can be obtained from the map of FIG. 8 based on the accelerator pedal position, PA, and the number of engine revolutions, NE, at that instant in time. In step 2, it is determined whether the amount of intake air, GA, obtained in step 1 is larger than a predetermined value GAT.

If YES in step 2, that is, if the amount of intake air, GA, is larger than the predetermined value GAT, this means that the engine is to be operated by increasing the A/F ratio in accordance with the amount of intake air.

Figure 17:
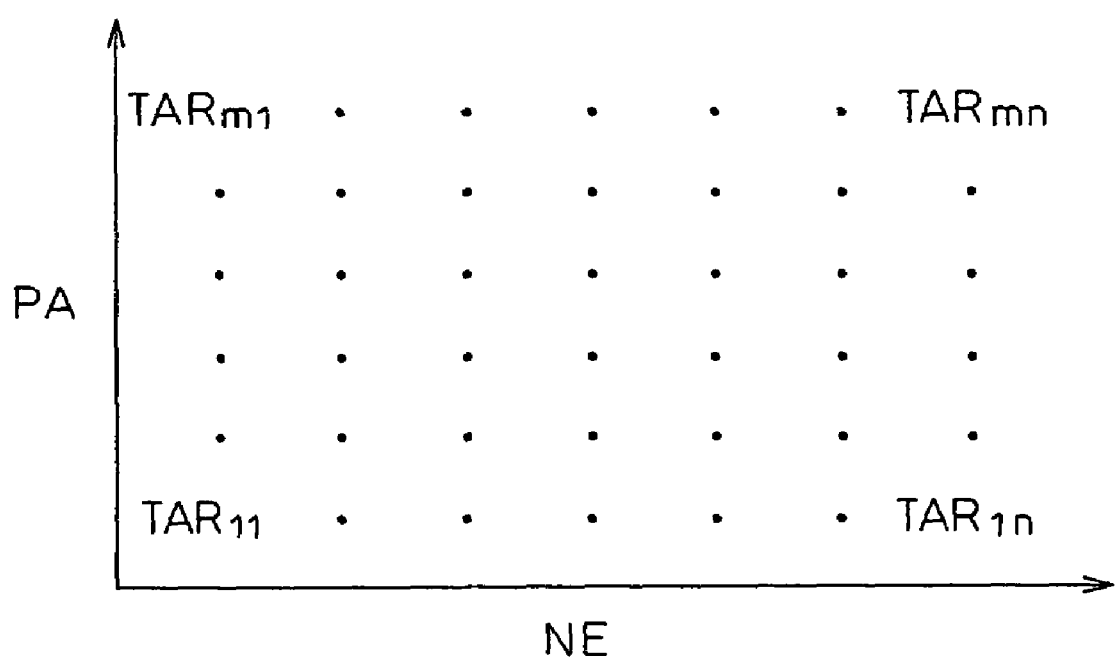
FIG. 17 is a map that defines the required air temperature.

In this case, the process proceeds to step 3 where, based on the intake pipe pressure detected by the intake pipe pressure sensor 8, it is determined whether the turbocharger 2 is working to supply pressurized air. If YES in step 3, that is, if pressurized air is being supplied, the process proceeds to step 4 to read the intake air temperature, TA, detected by the intake air temperature sensor 9. The process further proceeds to step 5 to read the required intake air temperature, TAR. Here, the required intake air temperature, TAR, is stored in the form of a map as shown in FIG. 17 in corresponding relationship to the A/F ratio shown in FIG. 9.

Then, the process proceeds to step 6 to determine whether the intake air temperature, TA, is lower than the required intake air temperature, TAR. If YES in step 6, that is, if the intake air temperature, TA, is lower than the required intake air temperature, TAR, the process proceeds to step 7. In step 7, the intercooler air flow control valve 5 is controlled so as to increase the flow rate of air directed from the first port 5a to the third port 5c and to reduce the flow rate of air directed from the first port 5a to the second port 5b, thereby increasing the amount of air passing through the fifth intake pipe 15 and thus causing the intake air temperature to rise.

After step 7 is completed, the process returns to step 6 to repeat the steps 6 and 7 until a NO response is produced in step 6, that is, until the intake air temperature, TA, becomes higher than the required intake air temperature, TAR. If a NO response is produced in step 6, the process proceeds to step 8 where the process is terminated. On the other hand, if NO in step 2 or NO in step 3, the process jumps to step 8 where the process is terminated without further doing anything.

The first embodiment is configured and operated as described above, that is, when the amount of intake air is larger than the predetermined value, the engine is operated with a variable the A/F ratio which increases as the amount of intake air increases, and when the turbocharger is working, the intake air temperature is controlled to the required intake air temperature. In this way, by operating the engine with a high A/F ratio, the exhaust gas temperature decreases, and the generation of NOx can thus be suppressed. Further, when the turbocharger is working, the intake air is maintained at an optimum temperature, and the fuel is properly atomized, ensuring stable combustion.

Figure 2:
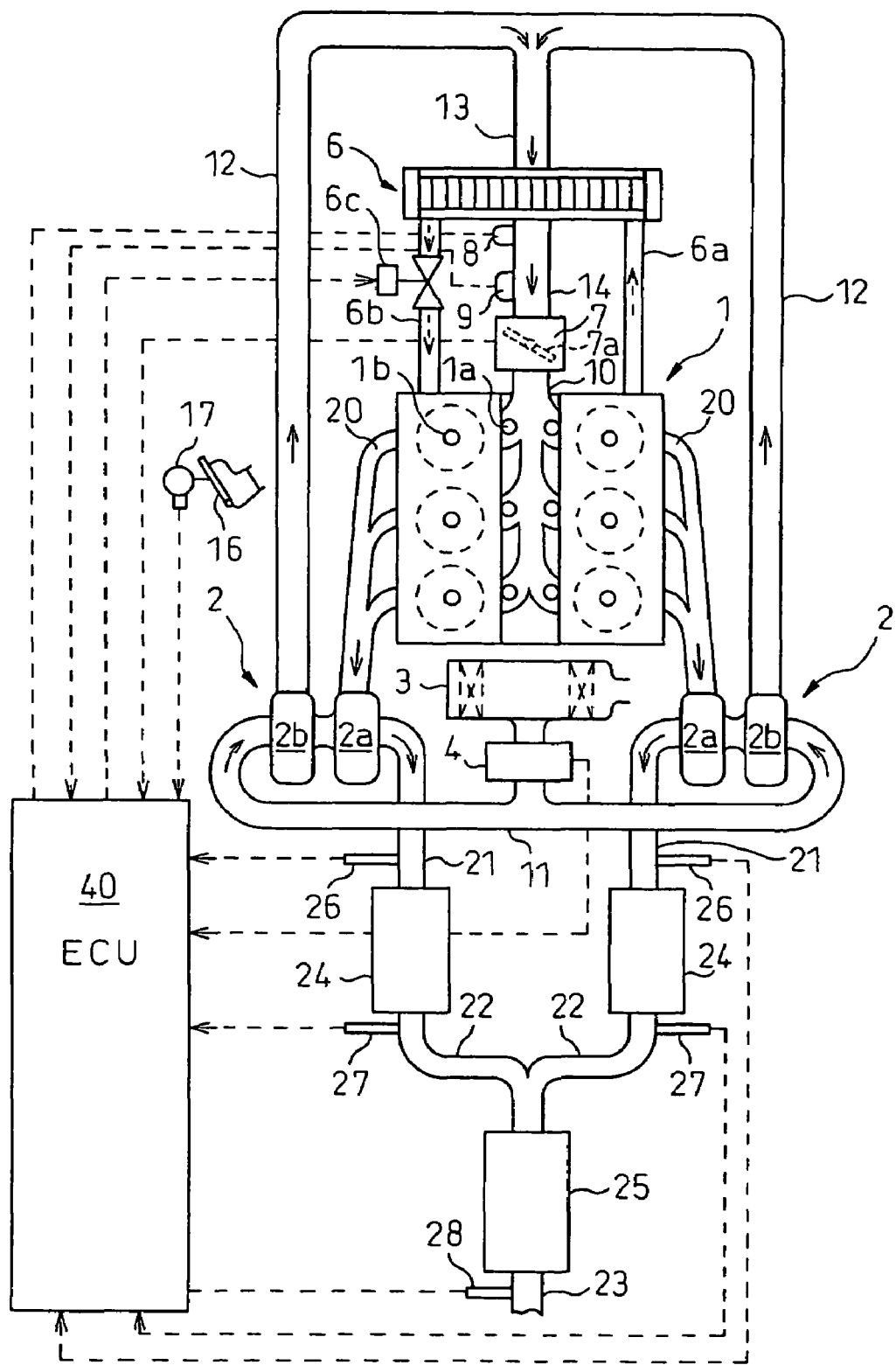
FIG. 2 is a diagram showing the configuration of a second embodiment.

Next, a second embodiment will be described. FIG. 2 is a diagram showing the configuration of the second embodiment, which differs from the first embodiment shown in FIG. 1 in that the bypass control valve 5 and the fifth intake pipe 15 are eliminated and, instead, a coolant flow control valve 6c is provided at an intermediate point in the coolant pipe 6b through which the coolant is returned from the intercooler 6 to the internal combustion engine 1.

Figure 15:
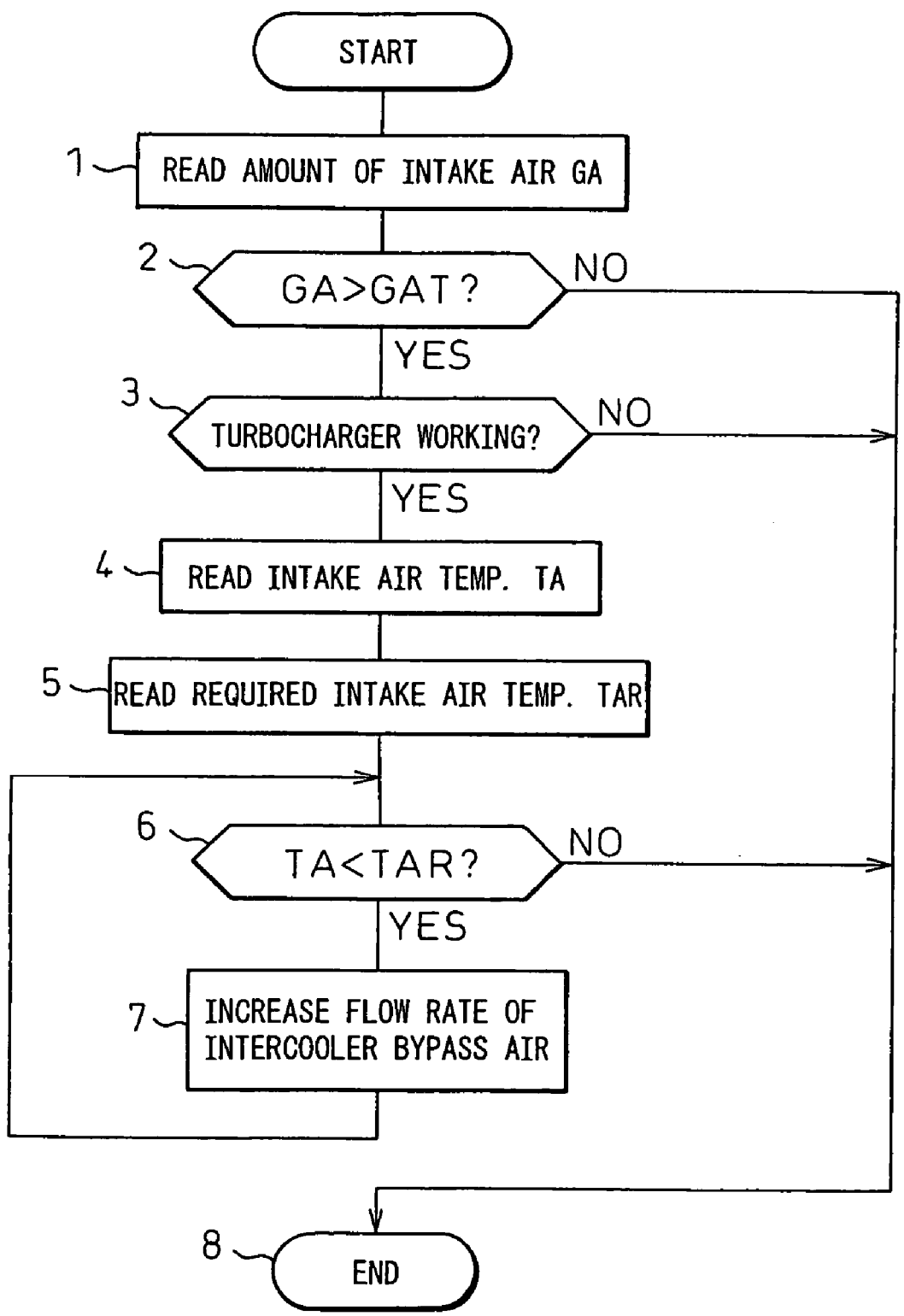
FIG. 15 is a flowchart illustrating the control performed in the first embodiment.
Figure 16:
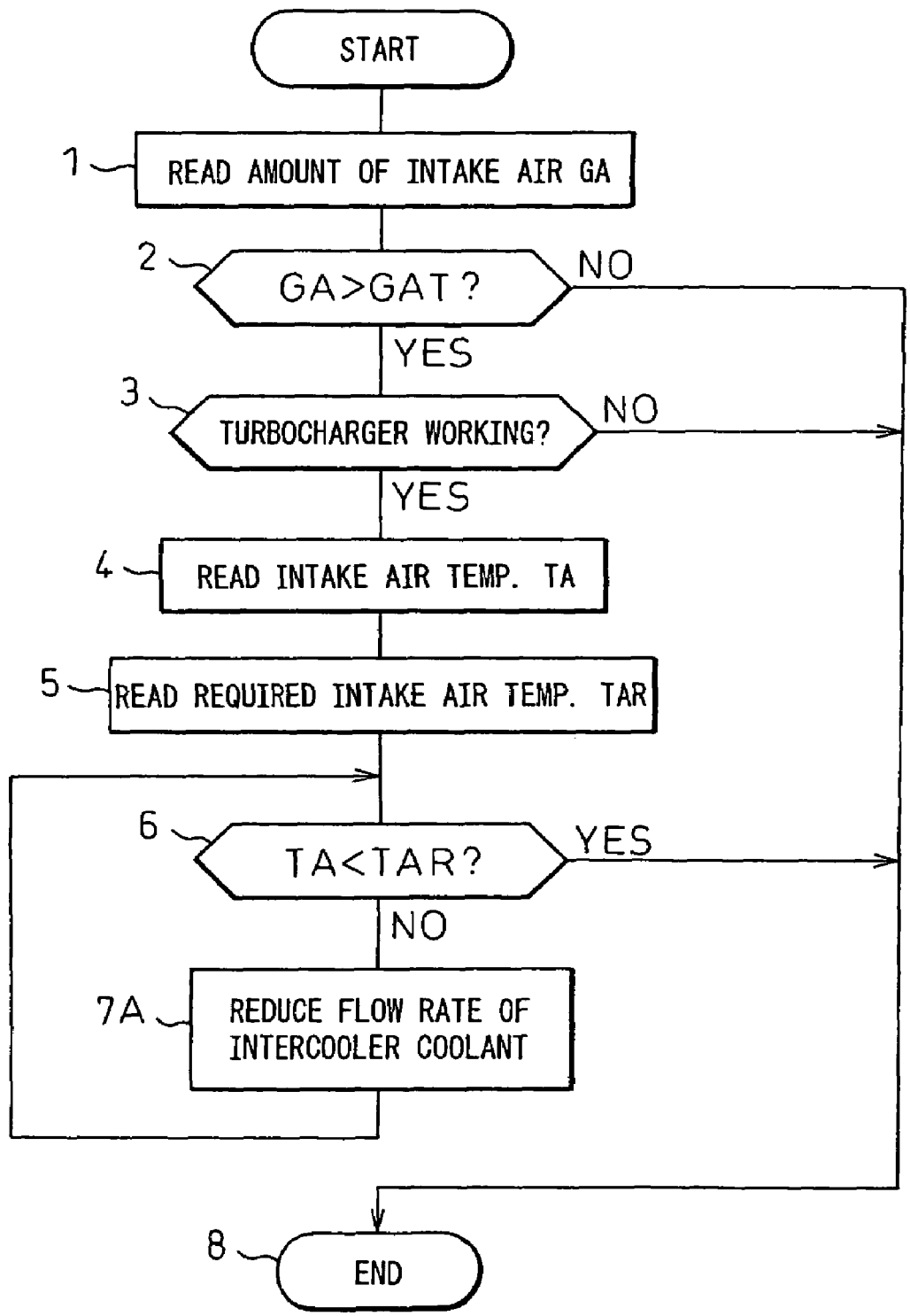
FIG. 16 is a flowchart illustrating the control performed in the second embodiment.

Then, control is performed in accordance with the flowchart shown in FIG. 16. This flowchart differs from the flowchart of the first embodiment shown in FIG. 15 in that, to reflect the above change in configuration, step 7 in FIG. 15 is replaced by step 7A where the flow rate of the intercooler coolant is reduced. In other respects, this flowchart is the same as the flowchart of FIG. 15. That is, when the intake air temperature, TA, is lower than the required intake air temperature, TAR, the coolant flow control valve 6c is controlled in step 7A so as to reduce the intake air cooling effect of the intercooler, thereby causing the intake air temperature to rise, but in other respects, this embodiment is the same as the first embodiment, and the same effect as that achieved in the first embodiment can be obtained.

What is claimed is:

1. An internal combustion engine wherein said engine is operated with a predetermined fixed A/F ratio in an operating range where the amount of intake air is not larger than a predetermined value but, in all operating ranges where the amount of intake air is larger than said predetermined value, said engine is operated with a variable lean A/F ratio which increases from said fixed A/F ratio as the amount of intake air increases.

2. An internal combustion engine as claimed in claim 1, wherein the amount of intake air is controlled by an intake air flow control means, and said intake air flow control means adjusts the amount of intake air in accordance with accelerator pedal position, and wherein an accelerator correspondence ratio, which represents an adjustment ratio between said accelerator pedal position and the amount of intake air, is increased as said A/F ratio increases.

3. An internal combustion engine as claimed in claim 2, wherein said intake air flow control means is an electronic throttle valve that controls throttle valve opening by an electrical signal, and an accelerator pedal position detecting means for detecting said accelerator pedal position is attached to an accelerator pedal, wherein said electronic throttle valve controls said throttle valve opening based on an electrical signal supplied from said accelerator pedal position detecting means.

4. An internal combustion engine as claimed in claim 1, further comprising a supercharger for pressurizing intake air, and wherein the amount of intake air is increased by using said supercharger, at least in the operating range where said engine is operated with said variable lean A/F ratio.

5. An internal combustion engine as claimed in claim 4, further comprising a pressurized air cooling means for cooling said intake air pressurized by said supercharger, and a pressurized air cooling control means for controlling the degree of cooling of said pressurized intake air passing through said pressurized air cooling means, and wherein in the operating range where said engine is operated with said variable lean A/F ratio, intake air temperature is controlled so that the temperature of said intake air increases as said A/F ratio increases.

6. An internal combustion engine as claimed in claim 5, further comprising a bypass air passage for allowing said pressurized intake air to flow by bypassing said pressurized air cooling means, and wherein said pressurized air cooling control means controls the temperature of said pressurized intake air by controlling the amount of intake air passing through said bypass air passage.

7. An internal combustion engine as claimed in claim 5, wherein said pressurized air cooling means has a coolant passage, through which a coolant flows, and said pressurized air cooling control means controls the temperature of said pressurized intake air by controlling the flow rate of said coolant.

8. An internal combustion engine as claimed in claim 2, further comprising a supercharger for pressurizing intake air, and wherein the amount of intake air is increased by using said supercharger, at least in the operating range where said engine is operated with said variable lean A/F ratio.

9. An internal combustion engine as claimed in claim 3, further comprising a supercharger for pressurizing intake air, and wherein the amount of intake air is increased by using said supercharger, at least in the operating range where said engine is operated with said variable lean A/F ratio.

* * * * *